United States Patent [19]

Rizzo et al.

[11] Patent Number: 5,677,928
[45] Date of Patent: Oct. 14, 1997

[54] SPREAD SPECTRUM COMMUNICATION SYSTEM

[75] Inventors: Michael A. Rizzo, Garden Gove; Robert E. Gorney, Riverside; Mark T. Primich, Hungtington Beach, all of Calif.

[73] Assignee: McDonnell Douglas Corp., Huntington Beach, Calif.

[21] Appl. No.: 795,165

[22] Filed: Nov. 18, 1991

[51] Int. Cl.[6] .................................................. H04K 1/00
[52] U.S. Cl. ......................... 375/202; 375/200; 375/204; 375/205
[58] Field of Search ........................................... 375/1

[56] References Cited

U.S. PATENT DOCUMENTS

| | | | |
|---|---|---|---|
| 4,455,651 | 6/1984 | Baran | 375/203 |
| 5,265,121 | 11/1993 | Stewart | 375/343 |
| 5,353,301 | 10/1994 | Mitzlaff | 375/200 |

*Primary Examiner*—David C. Cain
*Attorney, Agent, or Firm*—Gregory A. Cone

[57] ABSTRACT

Digital information is convolved with a pseudorandom code and then transmitted at radio frequency in a spread spectrum signal to a receiver also containing the same pseudorandom code. Since the transmitted signal is below the noise floor for that bandwidth, it is virtually unjammable and undetectable without possession of the pseudorandom code. Successful extraction of the transmitted information depends upon precise matching of the transmitted frequency and the exact phase matching of the pseudorandom code at the receiver with the convolved pseudorandom code in the transmitted signal.

15 Claims, 5 Drawing Sheets

SPREAD SPECTRUM COMMUNICATION SYSTEM

BACKGROUND OF THE SPECIFICATION

This invention relates to communications systems. More particularly this relates to radio transmissions in which digital information is combined with a pseudorandom code which is used to modulate the radio frequency transmission.

There are a variety of applications, chiefly military, that have an unmet need for a secure system to transmit identification or location information from one location to another, typically between the ground and the air. Past less sophisticated systems normally used either simple radio frequency, infrared or visual signals which emit a signature which can be exploited by the enemy to discover the transmitting location. The more conventional IFF (Identify Friend Foe) systems are much more complicated and costly. A first interrogation signal is sent from one location which is then received and responded to at a second location. The transmitted signal from the second location is then received and processed by the first location. This type of IFF system operates very quickly, but suffers from the same weakness of allowing unauthorized receivers to identify the transmitting location. Conventional spread spectrum transmitting systems offer a low probability of signal detection, but normally require 20 or more seconds to go through the interrogation cycle and correlate to extract the transmitted information. There are no known systems available at this time which can transmit a low probability of detection signal, receive it, and correlate a message in under three (3) seconds.

SUMMARY OF THE INVENTION

This system is designed to transmit a signal at radio frequency. The signal is created using direct sequence spread spectrum techniques, transmitting the signal at a power level which is below the KTB noise floor for the transmitting frequency. The signal is therefore virtually undetectable to any receiver other than one employing the specific spreading code sequence of the transmitter. This code can be changed daily, hourly, or any time required and is chosen from thousands of candidate codes. These spread spectrum techniques also have the advantage of being virtually unjammable. The use of millimeter wave radio frequencies allows the use of small, very narrow beamwidth receiving antennas for very accurate receiver discrimination. Millimeter wave signals also travel as far or farther than infrared signals in all environmental conditions. Since the signal is virtually undetectable by unauthorized receivers, the system can transmit either in short bursts or continuously. The one way transmission cuts equipment complexity and cost by at least one half over classic IFF systems which must interrogate and then receive signals from other locations to verify identification.

The transmitter generates data which may contain information relating to identity and/or location and also generates a pseudorandom code. The pseudorandom code is clocked at a relatively high first rate and then added in phase with lower rate data to form a composite signal at the first clock rate. This composite signal is then mixed with the continuous radio wave carrier signal and transmitted. The mixing of the composite signal at the first clock rate with the carrier wave spreads the modulated transmitted signal from the center frequency of the carrier wave into a bandwidth centered on the carrier wave's frequency and extending on each side by a bandwidth equal to the clock rate to form a spread of twice the first clock rate. This spread should be sufficient to lower the signal power density per hertz below the KTB noise floor for the transmitting frequency at any range greater than several tens of feet from the transmitting location. The transmitter broadcasts either for a short interval then goes silent and then transmits again on a periodic basis or can transmit continuously. The receiver down converts the received signal to an intermediate frequency and then mixes this signal with a locally generated pseudorandom code sequence identical to that at the transmitter. The receiver is capable of correcting for shifts in the transmitted frequency due to a variety of conditions allowing for an exact frequency match between the clock rate of the received signal and the circuitry in the receiver attempting to correlate the received signal and extract the data from the transmitter. When the frequency has stabilized, the receiver has the capability to phase shift the pseudorandom code generated at the receiver to exactly match with the phase of the received signal from the transmitter. Once this is done the data in the signal from the transmitter is easily extracted and can be displayed or retransmitted from the receiver.

DETAILED DESCRIPTION OF THE INVENTION

The following specific embodiment implements the communication system of this invention in a ground based equipment identification application. It has a variety of other applications as well.

Figure 1:
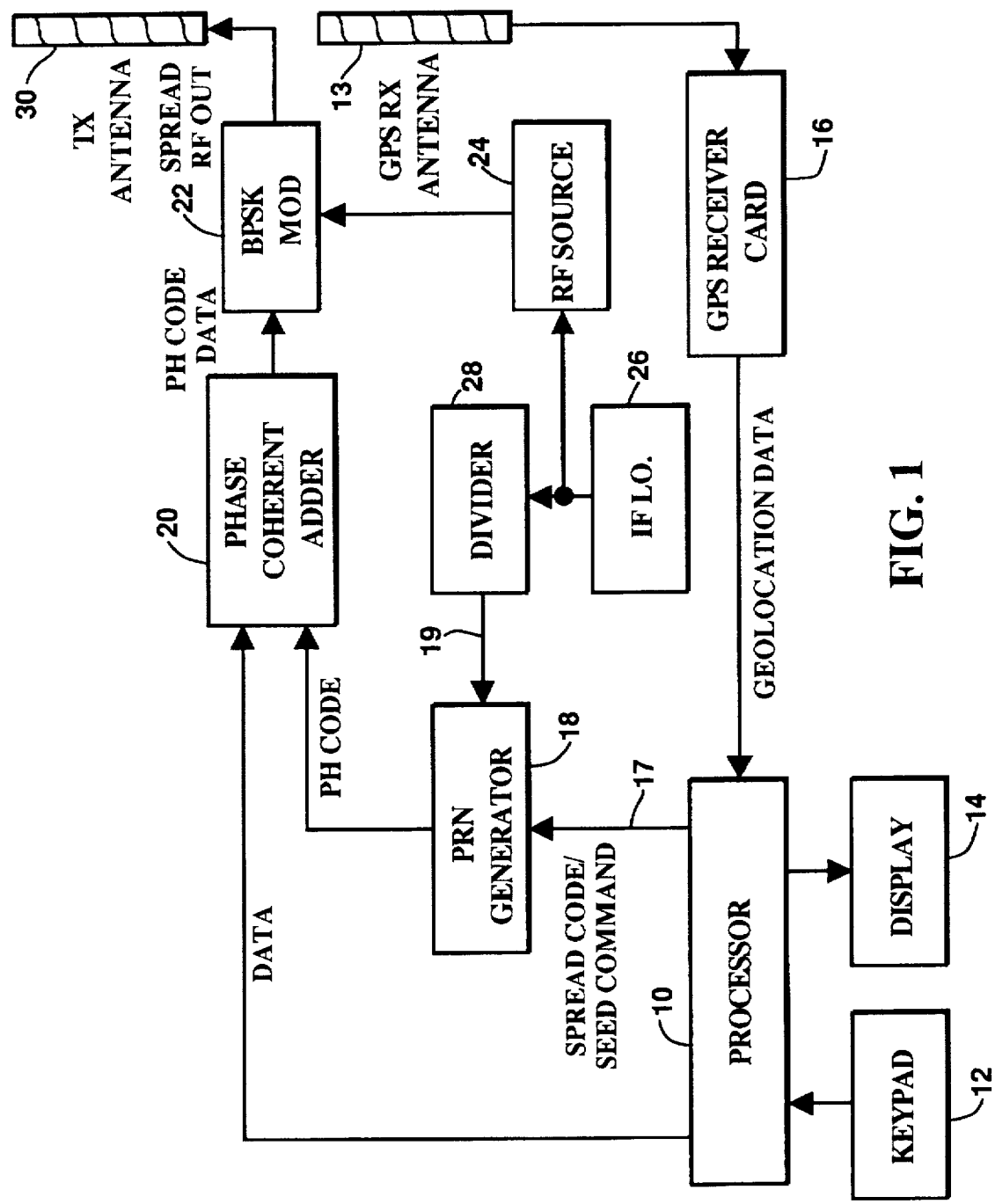
FIG. 1 is a block diagram of the functional subsystems within the transmitter.

Turning now to FIG. 1, most of the operations in the transmitter unit shown in this Figure are referenced to the intermediate frequency produced by the local oscillator 26. This intermediate frequency for this embodiment is 70 megahertz (MHz). The source 24 for the radio frequency carrier wave is referenced to the local oscillator and operates here at 94.08 GHz. The 70 MHz from the local oscillator is run through a divide by six block 28 and then becomes the clock via line 19 for the pseudorandom code generator 18. This clock operates at approximately 12 MHz. Data describing the vehicle on which the transmitter is mounted, or other information, is entered into a processor 10 either via a key pad 12 or possibly is preprogrammed into the processor during manufacture of the unit. The key pad 12 may also serve as a source for the seed command transmitted over line 17 to the pseudorandom code generator 18 which initiates the creating of the unique pseudorandom code. The processor 10 may also drive a display 14. If location data is also desired for the vehicle carrying the transmitting unit, geolocation data may be provided to the processor by a global position satellite (GPS) subsystem comprising a GPS receiving antenna 13 and a GPS receiver card 16 which provide the processor 10 with the precise geographic coordinants of the transmitting location. The data descriptive of the transmitting vehicle and other information as necessary such as the geolocation data, are transmitted over a data line 15 to a phase coherent adder 20 at a relatively low data rate of about 1200 bits per second. The pseudorandom code from the generator 18 is conducted to the phase coherent adder 20 where it is phase combined with this data. The combined output of the phase coherent adder 20 is clocked at the 12 MHz data rate into the BPSK modulator 22. This block acts to modulate the carrier wave at 94.08 GHz from the radio frequency oscillator 24 with the combined pseudorandom code and data from the phase coherent adder. The result is a spread spectrum radio frequency output transmitted from the antenna 30. The transmitted signal has been spread across a bandwidth of 24 MHz and has a signal power density per hertz that is now 40 dB below an identical "non-spread" signal for the 1200 bps data rate. At an output power level of 25 mW, the transmitted signal will drop below the KTB noise floor at a range of approximately 75 feet. This low spread spectrum power level makes it virtually undetectable by an unauthorized receiver. For this particular implementation the signal is transmitted continuously through a vertically polarized antenna with omnidirectional coverage. The authorized receiver might be housed in either another ground vehicle or an aircraft or a ship.

Figure 2:
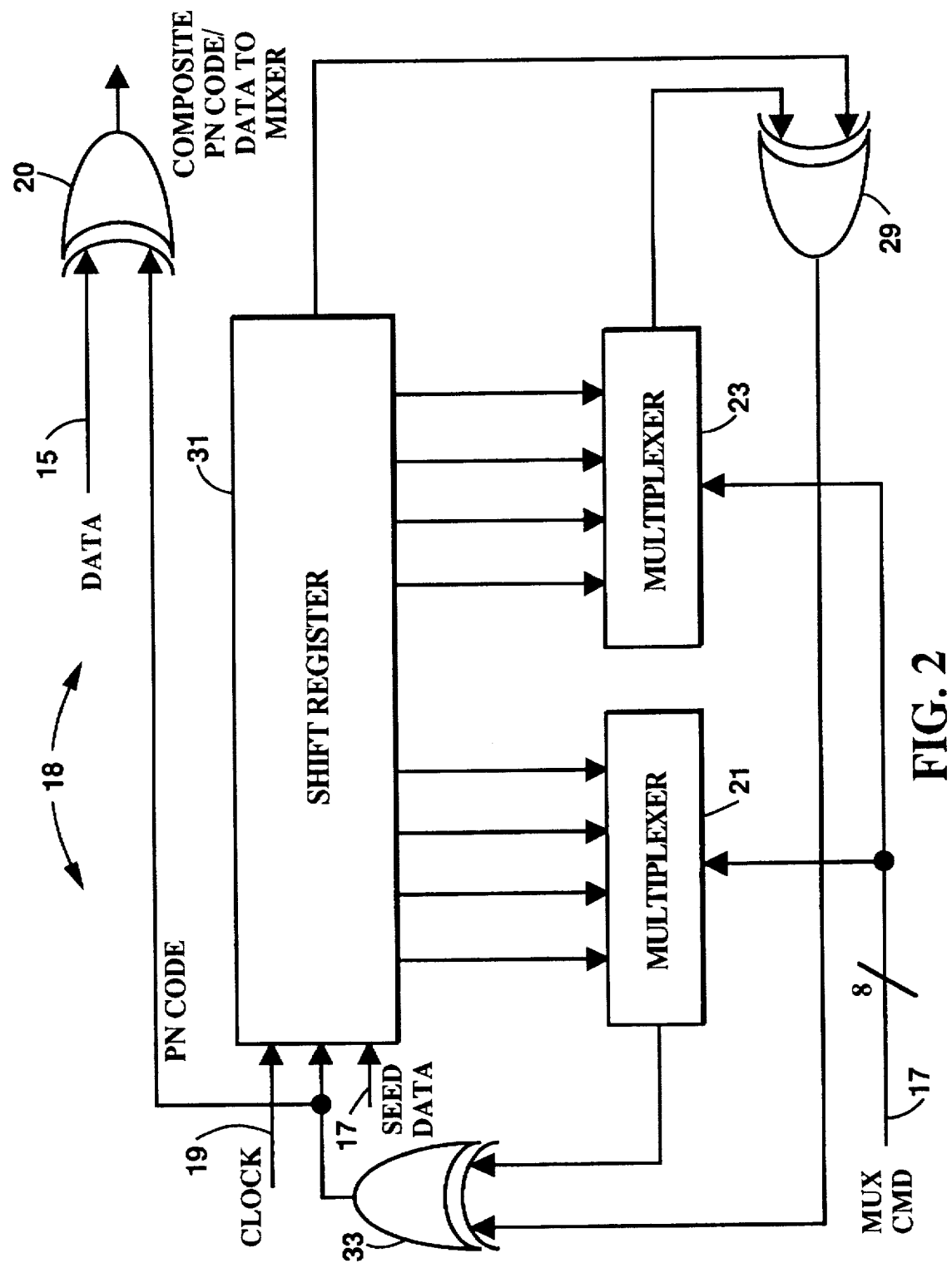
FIG. 2 is a block diagram showing the operation of the pseudorandom code generator.

The operation of the pseudorandom code generator 18, shown in FIG. 2, is controlled by configuration commands from the microprocessor at a rate controlled by the clock line 19. The shift register 31 has programmable feedback taps in the multiplexers 21 and 23 controlled by commands from the microprocessor over line 17 and also variable seed combinations provided to the shift register over another branch of line 17. The pseudorandom code generator 18 can create thousands of possible nonmaximal length pseudorandom codes, those of use here being about 2000 to 7000 bits in length before repetition of the particular sequence. An identical pseudorandom code generator operating under the same conditions is present in the receiver. The pseudorandom code output leaves the NOR gate 33 and is conducted to the phase coherent adder 20, here shown as another NOR gate where it is combined in phase with the low rate digital data from line 15. The output of the phase coherent adder 20 is then conducted to the modulator 22 where it is combined with the 94.08 GHz carrier wave.

Figure 3:
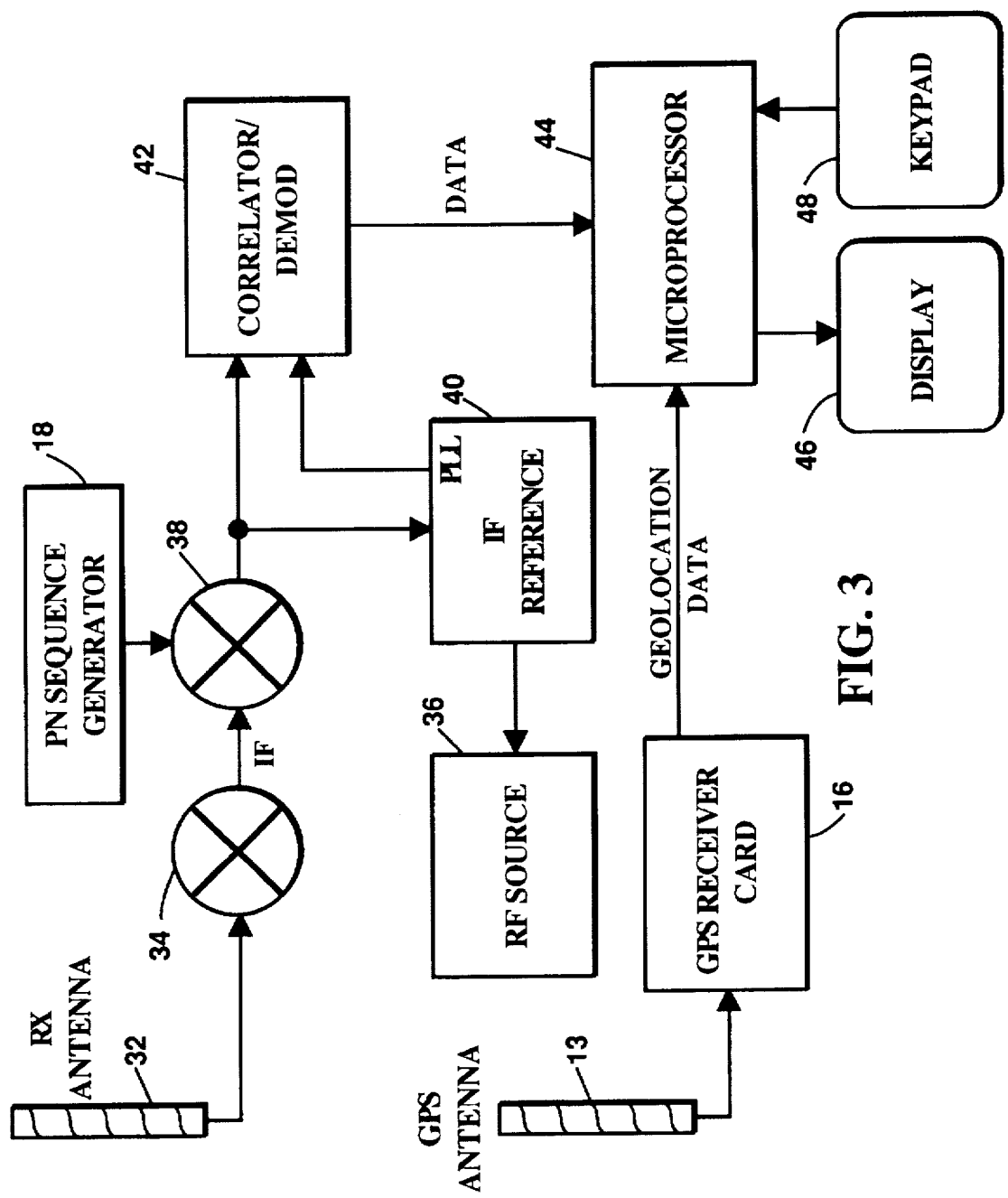
FIG. 3 is a block diagram showing the simplified operation of the receiver.

In a typical ground-to-ground military application the receiver unit would have an antenna 32 as shown in FIG. 3 which is bore sighted with the optical sighting system of the offensive weapon carried on the receiving platform. The receive antenna would be a high efficiency, low side lobe, circularly polarized parabolic dish or horn lens. In some applications the receive antenna might be mounted remotely from the receiver unit. The antenna would have a three dB beamwidth of approximately 1.6 degrees. Therefore, at a maximum design range of about 12 Km, the receiver will be capable of discriminating between vehicles 150 meters apart which would be transmitting their own unique identifying information via their own transmitting units. Target discrimination would be achieved by pointing the optical sighting device at a candidate target. The bore sighted receive antenna would receive a signal from the target, and the receiver will lock onto the spread spectrum code being transmitted from the target. If the target is not transmitting any code or an improper code, the receive unit will not respond, and the target will not be identified as friendly. In this type of application the receiving unit would always be searching for a signal to acquire, and no operator action would be required while searching for targets.

For this particular embodiment, the received signal is down converted in a demodulator 34 which is connected to a radio frequency source in the receiver 36 here operating at 94.01 GHz. This operates to create an approximate 70 MHz intermediate frequency as the output of the mixer 34. This signal is conducted to another mixer 38 where it is combined with a receiver generated pseudorandom code produced by another pseudorandom code generator 18 which creates a code which is identical to that in the transmitting unit. Threshold detector circuitry in the receiver senses the presence of a correlated signal, and the receiver circuitry locks to the incoming signal via a feeack loop through blocks 40 and 36. When the locally generated pseudorandom code's sequence exactly phase matches the spread code in the received signal, the signals will correlate in the block 42 and the data from the transmitting unit will be extracted and conducted to the microprocessor 44 for display 46 or other purposes. If necessary the receiving unit might also be provided with precise geolocation data via the GPS antenna 13 and GPS receiver card 16, as also shown in FIG. 1. The microprocessor 44 may also be provided with a key pad 48 for entry of the seed data for the pseudorandom code or other purposes.

This system results in a virtually unjammable receiver because of the mixing operation of the correlator. A jamming signal when received by the antenna 32 will also be mixed internally with the receiver pseudorandom code and will be spread by the mixing action. A CW jammer will be spread by the local code to a 24 MHz bandwidth, losing 40 dB of power. If the jamming signal also contains an improper spread code, it will be spread at each noncorrelating phase change up to 48 MHz, losing 43 dB of power. However, a signal containing the proper pseudorandom code from a transmitter will correlate inside the receiver and gain 40 dB of power. A jammer must therefore insert approximately 70 dB of power into the receiving antenna above the level of the signal of interest to cause signal acquisition problems. The jammer must also be in a direct line of sight with the transmitting unit and the receiver to be in the very narrow one degree beamwidth of the receiving antenna used in this particular application. A 500 mW/CW jammer, the most powerful conceivable with the current state-of-the-art, located the same distance from the receiver as an authorized transmitter would need a three foot parabolic dish to cause disruption of signal correlation at the receiver.

Figure 4:
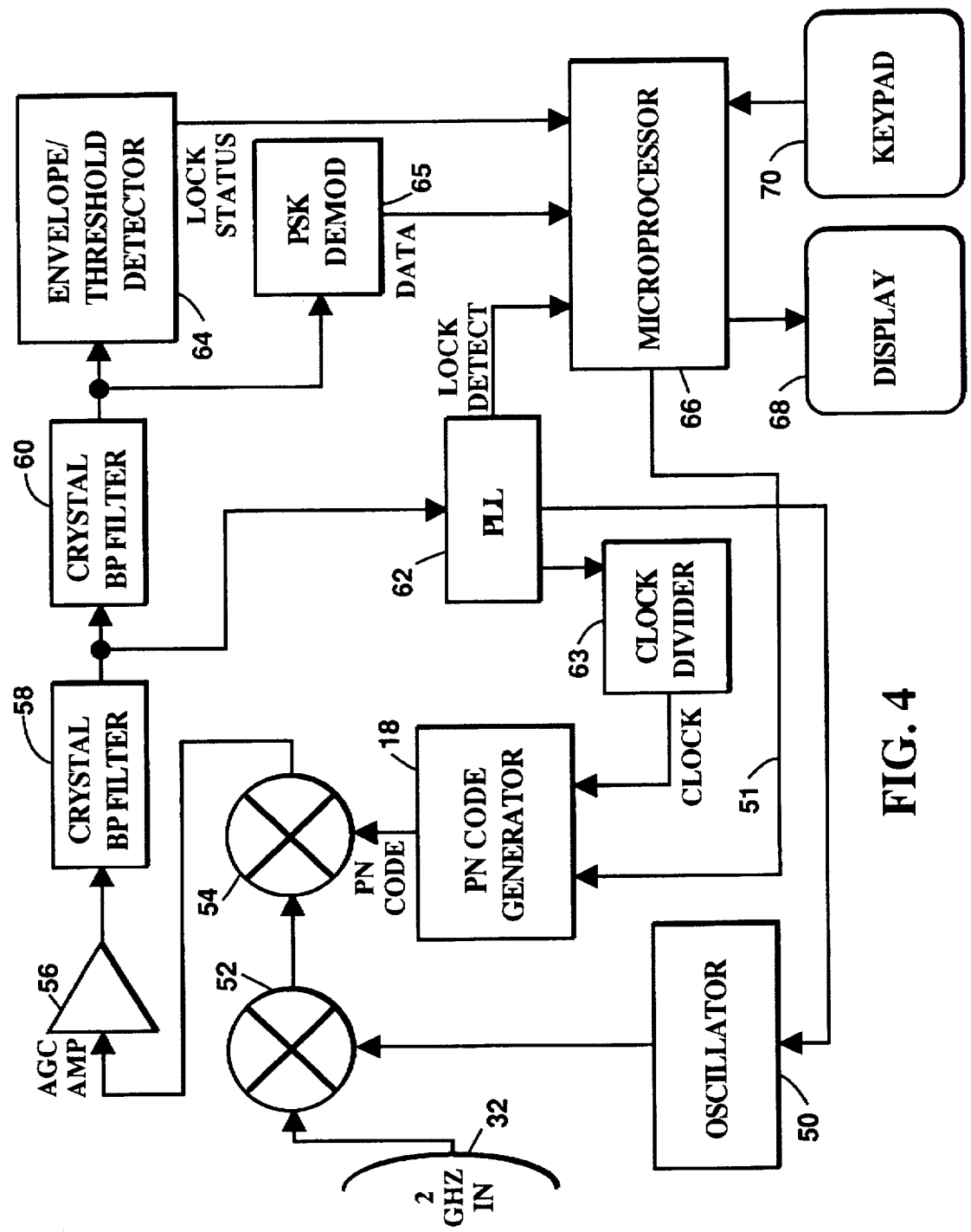
FIG. 4 is a more detailed block diagram of the receiver illustrating the frequency matching capability.

The received signal must meet several criteria within the receiver in order for a correlation to occur to result in the successful reception of the transmitted data. The radio frequency of the transmitter and the receiver must be successfully matched, the clock or chip rate between the received signal and the internally generated pseudorandom code must be the same, the pseudorandom codes must match, and the phase of the internally generated pseudorandom code at the receiver must exactly match the received combined pseudorandom code and data signal from the transmitter. Speed of correlation is of the essence and this system will successfully extract data in less than three seconds. This should be compared with a typical spread spectrum system which normally requires at least 20 seconds to correlate. The transmitter will transmit a base band modulated signal at 94.08 GHz. This signal may vary from the nominal frequency because of age, temperature or frequency drift. The maximum transmit signal frequency deviation caused by these variations from nominal is assumed to be +/−94 KHz. If the receiver unit is located on an aircraft, doppler shift will add to the RF frequency deviation. An aircraft flying at 250 knots will experience a doppler shift for approximately +/−35 KHz. The total RF frequency uncertainty is therefore less than about +/−150 KHz. As shown in FIG. 4, the receiver mixes the incoming 94.08 GHz +/−150 KHz signal against a locally generated signal nominally centered at 94.01 GHz coming from oscillator 50. This mixing will yield a spread spectrum signal, 24 MHz wide, well below the noise floor, centered on 70 MHz with a frequency uncertainty of +/−150 KHz. This signal will then be mixed with the locally generated pseudorandom code sequence originating from generator 18. When correlation has occurred, a 70 MHz intermediate frequency signal will appear at the input to the phase lock loop (PLL) circuitry 62 as a spike of signal energy. The frequency of this signal will be within +/−150 KHz of 70 MHz. This signal will pass through a crystal band pass filter 58, centered around 70 MHz with a 300 KHz bandwidth. The PLL will very quickly sense the correlated signal, and a change frequency to phase lock to it. The 94.01 GHz source 50 is externally referenced to the 70 MHz oscillator in the PLL, as shown. As the PLL changes frequency to capture the correlated signal, the 94.01 GHz source frequency is also changing at a 1343 Hz to 1 Hz ratio. This causes the correlated signal to move very quickly toward 70 MHz. A maximum excursion of the 70 MHz reference should be no greater than +/−112 Hz to cause +/−150 KHz movement of the 94.01 GHz source 50. The 70 MHz correlated signal, containing the 1200 BPS data from the transmitter then passes through the correlator band pass filter 60 centered at 70 MHz with a 7 KHz bandwidth and is processed by the envelope detector 64 and the PSK Demodulator 65.

As discussed previously, the frequency of the transmitted signal varies as a function of time, temperature and doppler. The chip rate of a spread spectrum system refers to the speed of the pseudorandom code sequence which will also vary for the same reasons. In the transmitting unit, the pseudorandom code generator clock is created by dividing the 70 MHz reference oscillator frequency by six (6). The 70 MHz reference oscillator also externally references the 94.08 GHz source in the transmitter. The transmitting unit 70 MHz reference oscillator will not vary from nominal frequency more than +/−70 Hz. This variance will therefore also slightly change the chip rate and RF center frequency of the transmitter. For good correlation, the chip rates must be exactly in phase. The receiver accounts for these changes using the PLL circuit 62. The receiver also divides the 70 MHz oscillator signal in a clock divider 63 by six (6) to derive the chip clock inputted to the code generator 18. But the oscillator varies in frequency according to the PLL capture frequency. This will automatically keep the chip rate clocks at the same frequency, since frequency variations, including doppler, have the same proportional effect on all components of the transmitted signal.

One of the required conditions for successful correlation is that the phase transitions in the received signal must occur at precisely the same time as the internally generated pseudorandom code phase changes. Even if the locally generated code is correct and at the proper chip rate frequency, the signals will not fully correlate unless the pseudorandom sequences are matched in phase. In a properly constructed pseudorandom code, this occurs only when the codes are aligned. This alignment is the portion of the correlation procedure that typically takes the most time. The correlation circuitry in the receiver includes a chip retard/delay circuit which allows very fast code alignment. For linear codes of sequence length less than 7000 bits, testing shows that the codes aligned well within the one second design goal. Since the receiver unit does not know what portion of the transmitted pseudorandom code sequence is being received at a particular instant, it is constantly in search mode waiting to lock on an incoming signal.

Figure 5:
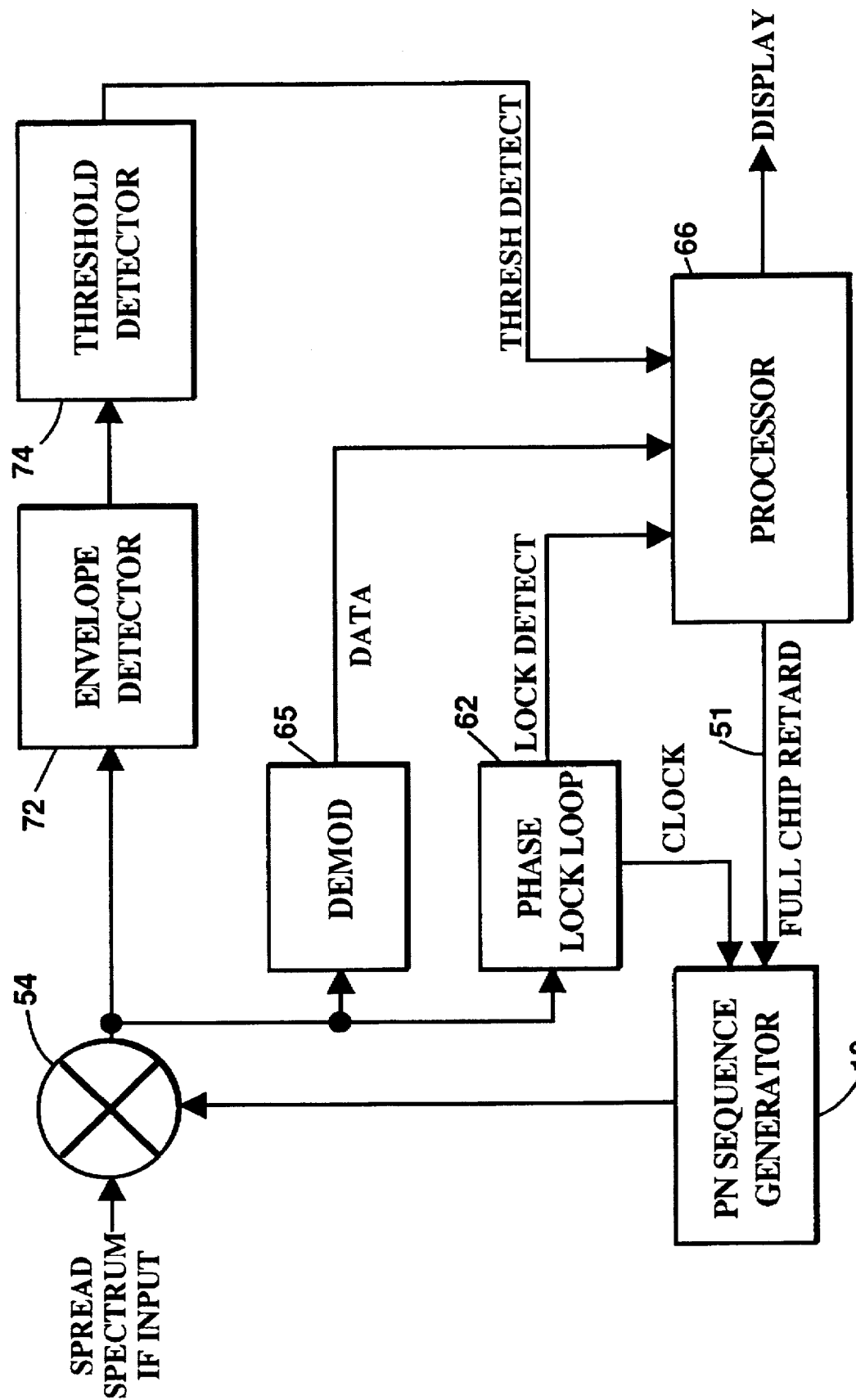
FIG. 5 is a block diagram of the correlation operation in the receiver.

FIG. 5 illustrates this phase locking capability. In the search mode, the pseudorandom sequence from the receiver's generator 18 is input to the correlation mixer 54 for 1.25 microseconds. This allows 15 chip periods of pseudorandom code to mix with the incoming signal. If there is no incoming signal or the pseudorandom code is not aligned with the incoming signal, no 70 MHz correlated energy is seen at the mixer output 54. The receiver chip clock is then retarded one chip period by a command over line 51 from the microprocessor, and the pseudorandom code is again applied to the correlated mixer for 1.25 microseconds. When the pseudorandom codes partially align, a slight amount of 70 MHz coherent energy will be seen at the mixer output. The envelope detector 72 contains a preset threshold level detector 74 which recognizes correlation. When the pseudorandom code aligns with the incoming signal, a dramatic change in 70 MHz correlated energy takes place. This change is recognized by the envelope detector 72, and the chip retard circuit is disabled. The phase lock loop 62 then keeps the pseudorandom codes in phase, and the PSK demodulator 65 senses the low rate data from the transmitter and sends it to the processor 66 for display.

In the above discussion, the geolocation data has been indicated as being an optional feature of the system. This information and capability finds good use when the system is implemented as a identification and location system. When a receiving platform is equipped with a broad beamwidth antenna, the transmitted signals from a plurality of different transmitting platforms can be displayed simultaneously to the aircraft pilot or system operator. Displayed information can include the identification of the transmitting platform, its status, and range and bearing between the transmitter and the receiver. The basic system could be repackaged to answer a variety of different requirements. The transmitting frequency can also be changed depending upon maximum range requirements. For example, a down pilot could be provided with a special transmitter which would contain the GPS module as well as the capability for typing a short message which would be transmitted in a three (3) second burst every 30 seconds. The burst length would be adequate to allow signal reception by search aircraft but would save battery life and lower even further the possibility of detection by enemy direction finding receivers. A similar transmitter could also be used to mark a hazardous area. When programmed with the proper positional cordinance and an identifier describing the hazardous condition, the message could be covertly transmitted to another platform. The transmitter could be configured to deactivate if it were moved or tampered with. The transmitting unit could also be configured as a homing unit. This would be particularly useful for finding areas such as logistical supply bases or command headquarters in inclement weather or at night. The transmitting unit would be provided with the global positioning system module and would transmit this location and identifying characteristics over an omnidirectional antenna with minimal chance of being jammed or received by unauthorized parties.

It should be appreciated that a variety of different implementations of this spread spectrum communication system are possible. The scope of the invention is defined by the following claims.

We claim:

1. A spread spectrum communication system comprising:
   a transmitter comprising:
   means to add, in phase, digital data descriptive of the transmitter at a data frequency to a psuedo random (PN) code at a higher frequency (chip rate);

means to generate a pseudo random code;

means to modulate a radio frequency carrier with the combined data and PN code to form a spread spectrum signal at a power level below the noise floor; and antenna means to transmit the modulated carrier; and a receiver comprising:

antenna means to receive the transmitted modulated carrier;

means to down convert the modulated carrier frequency to an intermediate frequency;

means in the receiver to generate the same PN code as is generated in the transmitter at about the same frequency (chip rate) as the transmitted PN code;

means to adjust the down convert means to produce a frequency match between the chip rate of the PN code in the received signal and the chip rate of a PN code generated in the receiver;

means to achieve an exact phase match between the receiver PN code and the transmitted PN code in the received signal;

means to separate the digital data from the PN code; and output means for the digital data.

2. The system of claim 1 wherein the means to adjust the down convert means comprises a phase locked loop means which adjusts the frequency of the down convert means and the frequency of receiver PN code generator.

3. The system of claim 1 wherein the means to separate the digital data comprises a PSK demodulator.

4. The system of claim 1 wherein the means to achieve an exact phase match comprises:

means to convey a plurality of periods of receiver PN code into a correlation mixer means also supplied with the received signal whose chip rate has been matched to the receiver PN code chip rate, said mixer having an output;

means to sense whether the output of the mixer is above a predetermined level indicative of a successful phase match;

means to retard the conveyance of at least one of a following plurality of periods of receiver PN code to the mixer if the predetermined level is not exceeded, said conveyances being successively and increasingly retarded until a successful phase match is achieved at which time the means to retard is disabled.

5. The system of claim 2 wherein the chip rate of the PN code in the transmitter is derived from a local oscillator operating at about the same frequency as the intermediate frequency in the receiver.

6. The system of claim 1 further comprising means within the transmitter to determine the location of the transmitter from GPS data.

7. The system of claim 1 further comprising means within the receiver to determine the location of the receiver from GPS data.

8. A spread spectrum communication system comprising:

a transmitter comprising:

means to add, in phase, digital data descriptive of the transmitter at a data frequency to a psuedo random (PN) code at a higher frequency (chip rate);

means to generate a pseudo random code;

means to modulate a radio frequency carrier with the combined data and PN code to form a spread spectrum signal at a power level below the noise floor; and antenna means to transmit the modulated carrier; and a receiver comprising:

antenna means to receive the transmitted modulated carrier;

means to down convert the modulated carrier frequency to an intermediate frequency;

means in the receiver to generate the same PN code as is generated in the transmitter at about the same frequency (chip rate) as the transmitted PN code;

means to adjust the down convert means to produce a frequency match between the chip rate of the PN code in the received signal and the chip rate of a PN code generated in the receiver;

means to achieve an exact phase match between the receiver PN code and the transmitted PN code in the received signal comprising means to convey a plurality of periods of receiver PN code into a correlation mixer means also supplied with the received signal whose chip rate has been matched to the receiver PN code chip rate, said mixer having an output; means to sense whether the output of the mixer is above a predetermined level indicative of a successful phase match; and means to retard the conveyance of at least one of a following plurality of periods of receiver PN code to the mixer if the predetermined level is not exceeded, said conveyances being successively and increasingly retarded until a successful phase match is achieved at which time the means to retard is disabled;

means to separate the digital data from the PN code; and output means for the digital data.

9. The system of claim 8 wherein the means to adjust the down convert means comprises a phase locked loop means which adjusts the frequency of the down convert means and the frequency of receiver PN code generator.

10. The system of claim 8 wherein the means to separate the digital data comprises a PSK demodulator.

11. The system of claim 8 further comprising means within the transmitter to determine the location of the transmitter from GPS data.

12. The system of claim 8 further comprising means within the receiver to determine the location of the receiver from GPS data.

13. The system of claim 8 wherein the means to adjust the down convert means comprises a phase locked loop means which adjusts the frequency of the down convert means and the frequency of receiver PN code generator.

14. The system of claim 13 wherein the chip rate of the PN code in the transmitter is derived from a local oscillator operating at about the same frequency as the intermediate frequency in the receiver.

15. The system of claim 8 further comprising means within the receiver to determine the range and location of the transmitter relative to the receiver from GPS data.

* * * * *